United States Patent
Ji et al.

(10) Patent No.: US 7,227,842 B1
(45) Date of Patent: Jun. 5, 2007

(54) FAST IP PACKET CLASSIFICATION WITH CONFIGURABLE PROCESSOR

(75) Inventors: Hongbin Ji, San Jose, CA (US); Michael Carchia, Santa Clara, CA (US)

(73) Assignee: Tensilica, Inc., Santa Clara, CA (US)

( * ) Notice: Subject to any disclaimer, the term of this patent is extended or adjusted under 35 U.S.C. 154(b) by 1030 days.

(21) Appl. No.: 10/133,689

(22) Filed: Apr. 23, 2002

Related U.S. Application Data (60) Provisional application No. 60/286,262, filed on Apr. 24, 2001.

(51) Int. Cl.
*H04L 12/28* (2006.01)
*H04L 12/56* (2006.01)

(52) U.S. Cl. ...................... 370/235; 370/392
(58) Field of Classification Search ............... 370/230, 370/230.1, 235, 389, 392
See application file for complete search history.

(56) References Cited

U.S. PATENT DOCUMENTS

| | | | |
|---|---|---|---|
| 5,951,651 A * | 9/1999 | Lakshman et al. | 709/239 |
| 6,018,524 A | 1/2000 | Turner et al. | |
| 6,141,738 A | 10/2000 | Munter et al. | |
| 6,243,720 B1 | 6/2001 | Munter et al. | |
| 6,341,130 B1 * | 1/2002 | Lakshman et al. | 370/389 |
| 6,434,144 B1 | 8/2002 | Romanov | |
| 6,563,823 B1 | 5/2003 | Przygienda et al. | |
| 6,571,313 B1 | 5/2003 | Filippi et al. | |
| 6,631,419 B1 | 10/2003 | Greene | |
| 6,658,482 B1 * | 12/2003 | Chen et al. | 709/245 |
| 6,697,363 B1 | 2/2004 | Carr | |
| 6,717,946 B1 * | 4/2004 | Hariguchi et al. | 370/392 |
| 6,782,382 B2 | 8/2004 | Lunteren | |
| 6,798,777 B1 | 9/2004 | Ferguson et al. | |
| 6,963,924 B1 | 11/2005 | Huang et al. | |
| 6,970,462 B1 * | 11/2005 | McRae | 370/392 |
| 6,975,631 B1 | 12/2005 | Kastenholz | |
| 6,980,552 B1 * | 12/2005 | Belz et al. | 370/392 |
| 2002/0002549 A1 | 1/2002 | Lunteren | |
| 2002/0080798 A1 * | 6/2002 | Hariguchi et al. | 370/395.31 |
| 2002/0118682 A1 | 8/2002 | Choe | |
| 2006/0039374 A1 * | 2/2006 | Belz et al. | 370/389 |

OTHER PUBLICATIONS

Chiueh et al., "High-Performance IP Routing Table Lookup Using CPU Caching", IEEE, pp. 1421-1427, 1999.
Degermark et al., "Small Forwarding Tables for Fast Routing Lookups", ACM, pp. 3-13, 1997.
Gupta et al., "Routing Lookups in Hardware at Memory Access Speeds", IEEE, pp. 1240-1246, 1998.

(Continued)

*Primary Examiner*—Seema S. Rao
*Assistant Examiner*—Hong Sol Cho
(74) *Attorney, Agent, or Firm*—Pillsbury Winthrop et al.

(57) ABSTRACT

A novel solution for fast packet classification includes a novel data structure to store classifier rules which enables fast packet classification, which structure employs bitmaps for each field of the incoming packet for which classification is desired. A fast packet classification algorithm using the novel data structure allows the matching rule with the highest priority to be quickly obtained. A novel rule update algorithm allows new classifier rules to be added into the data structure incrementally. In one practical implementation of a classification engine employing the structures and algorithms of the present invention, a configurable processor with customized instructions is used to accelerate packet classification.

3 Claims, 8 Drawing Sheets

OTHER PUBLICATIONS

Huang et al., "A Novel IP-Routing Lookup Scheme and Hardware Architecture for Multigigabit Switching Routers", IEEE J. on Selected Areas in Communications, 17(6):1093-1104, Jun. 1999.

Srinivasan et al., "Fast Address Lookups Using Controlled Prefix Expansion", pp. 1-37.

* cited by examiner

FIG. 4(a): Case (1)

FIG. 4(b): Case (2)

FIG. 4(c): Case (3)

FIG. 4(d): Case (4)

FIG. 5

| eqID | |
|---|---|
| 0 | 0 |
| 1 | 0 |
| 2 | 0 |
| . | 0 |
| . | 0 |
| . | 0 |
| 19 | 0 |
| 20 | 0 |
| 21 | 0  6 |
| 22 | 0  6 |
| 23 | 0 1 |
| 24 | 0 2 |
| .... | 0 2 |
| 1022 | 0 2 |
| 1023 | 0 2 |
| 1024 | 0 2 3 |
| .... | 0 2 3 |
| 5999 | 0 2 3 |
| 6000 | 0 2 3 4 |
| 6001 | 0 2 3 4 |
| 6002 | 0 2 3 4 |
| 6003 | 0 2 3 4 |
| 6004 | 0 2 3 5 |
| ... | 0 2 3 5 |
| ... | 0 2 3 5 |
| 65535 | 0 2 3 5 |

*RIB table*

| eqID | |
|---|---|
| 0 | $00000_b$ |
| 1 | $10000_b$   $10001_b$ |
| 2 | $00000_b$   $00001_b$ |
| 3 | $01000_b$   $01100_b$   $01101_b$ |
| 4 | $01110_b$   $01111_b$ |
| 5 | $01100_b$   $01101_b$ |
| 6 | $00001_b$ |
| .... | |
| 2N | |

*BMP table*

| eqID | Begin | End |
|---|---|---|
| 0 | (0) | (65535) (22) (20) |
| 1 | (23) | (23) |
| 2 | (24) | (65535) (1023) |
| 3 | (1024) | (65535) (5999) |
| 4 | (6000) | (6003) |
| 5 | (6004) | (65535) |
| 6 | (21) | (22) |
| .... | | |
| 2N | | |

*EP table*

FAST IP PACKET CLASSIFICATION WITH CONFIGURABLE PROCESSOR

CROSS-REFERENCE TO RELATED APPLICATIONS

The present application is based on, and claims priority from, U.S. provisional application No. 60/286,262, filed Apr. 24, 2001, commonly owned by the present assignee, the contents of which are incorporated herein by reference. This application is also related to U.S. provisional application No. 60/249,627, filed Nov. 16, 2000, entitled "Fast Route Lookup with Configurable Processor and Compressed Routing Table"; U.S. utility application Ser. No. 09/780,895, filed Feb. 9, 2001, now U.S. Pat. No. 6,888,838 issued May 3, 2005 based thereon; and U.S. provisional application No. 60/264,667, filed Jan. 25, 2001, entitled "Fast Route Lookup with Configurable Processor and Advanced Data Structure", on which is based U.S. utility application Ser. No. 10/032,379, filed Dec. 21, 2001, all of which are commonly owned by the present assignee and incorporated herein by reference.

BACKGROUND OF THE INVENTION

1. Field of the Invention

The present invention is directed to communication networks and, more particularly, to routing and classifying messages in communication networks.

2. Background of the Related Art

Figure 1:
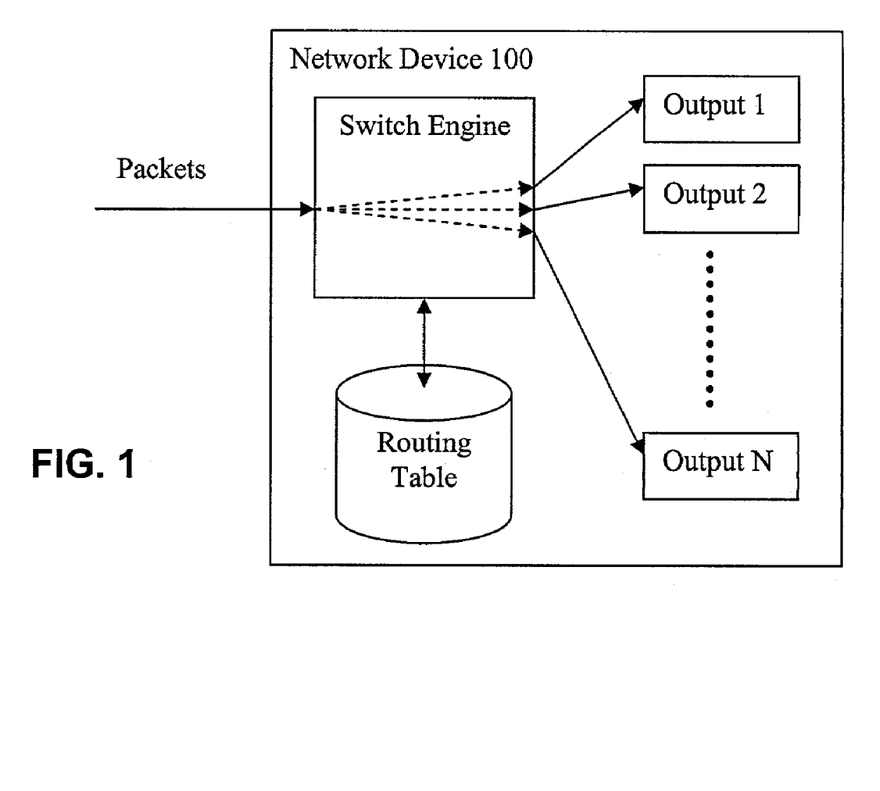
FIG. 1 is a top-level block diagram illustrating a network device employing conventional packet switching techniques.

Originally, the Internet was developed to support best effort services (such as data services) based on packet switched technologies while the telephony network provided circuit switched technologies to support dedicated connections such as for voice services. A network device 100 that can be employed in a network, such as the Internet, for switching packets is shown in FIG. 1.

Although best effort services were the original intent of packet-switched networks such as the Internet, there is a clear trend to support more improved and reliable services such as those supported by circuit-switched technologies. For example, a suite of Voice over Internet Protocol (VoIP) protocols and systems are under development and are being deployed. Furthermore, the Internet, which is based on IP protocols, will need to support a rich set of multimedia applications such as voice, data and video. To enable the Internet to transition from best effort service to a wide class of services, an emerging set of protocols such as differentiated services (diffserv) and integrated services (intserv) must be supported by switching elements throughout the network, such as network device 100.

These new protocols attempt to provide a means to distinguish one kind of packet (such as voice packets) from another kind of packet (such as best effort data packets) so that proper treatment is given to different kinds of packets. For example, in converged networks, premium treatment may be given to voice packets since voice packets have stringent delay and jitter requirements.

To distinguish between how different types of packets should be treated, packet classification is needed. Generally, packet classification can be characterized as matching a packet against a set of rules with multiple fields to identify the highest priority rule or rules matching the packet, and performing an action associated with the matching rule(s).

Packet classification plays an important role in many kinds of applications such as:

- firewall or access control, network security, intrusion detection monitoring and signature matching;
- policy based networking;
- QoS queuing selection to meet service level agreement (SLA) and support differentiated services with QoS guarantee;
- traffic accounting and billing, policing, and management; and
- network address translation (NAT).

For a firewall, static access control is currently one of the most popular applications for packet classification. An access control list (ACL) is maintained with sequential ordering. The first matching access control element is the rule to be applied to an incoming packet. The matching access control element is associated with an action (allow or deny the packet to go through). This is also called packet filtering. Typically a linear search is used for packet filtering. The static access control lists are generally configured by network operators and change less frequently while dynamic access control, which is also used in some firewall applications, may undergo frequent changes on the order of hundreds of changes per second.

Another popular application of packet classification noted above is policy based networking, which is used to enforce organizational policies such as automated operations, network management and control systems. In this context, a policy is a relationship between network objects such as particular groups of network elements, network resources/services, and user groups. For example, a company may enforce an authorization policy that gives the members in a particular department access to a particular service. Policy based networking relies on rules to automate network administration tasks such as configuration, performance, security, fault restoration, and service provisioning.

Differentiated services will be supported in the next generation networks. These require per-flow or per-class service queuing. So, packet classification is needed to identify which flow or class an incoming packet belongs to. It is critical to separate the packets from different flows or classes into different queues, which will be fairly dequeued by a packet scheduler, in order to meet service level agreements and guarantee QoS.

Billing is an important function of network equipment. Usage based billing has been used so that users are charged fairly based on the amount of their bandwidth usage. This requires classifying the packets in order to determine to which users they belong so as to perform traffic accounting and billing. Packet classification is also needed to police incoming traffic according to a service level agreement to prevent bandwidth stealing or detrimental usage, and to support denial of service (DoS) protection.

Finally, network address translation is used to conserve IP addresses since a shortage of IP addresses is becoming a problem due to the exponential growth of the Internet. NAT operates on a router between an intranet and public internet by translating between a special group of IP addresses, which are not Internet routable IP addresses defined by the Internet Assigned Numbers Authority (IANA) for use in private intranets, and public Internet routable IP addresses. For service providers, NAT saves the expense of registering large numbers of addresses with IANA. Enterprises can have their own internal IP address schemes and use only a limited number of IP addresses for public Internet access. NAT requires packet classification to perform one-to-one or many-to-one IP address translation by replacing the IP address in the IP header with a different IP address. The same applies to other fields such as the TCP/UDP port if port translation is desired.

FIG. 1 is a block diagram showing a conventional network device 100 that includes a switch engine 102 for determining how to treat different kinds of incoming packets in accordance with routing table 104. In an example where network device 100 is a typical present-day IP router, switch engine 102 determines how to forward packets to one or more of outputs 1 to N based solely on the IP destination address in the headers of the packets. In such an example, routing table 104 merely associates particular IP destination addresses with outputs 1 to N. However, next generation IP routers, in order to support the improved services mentioned above, may need to perform packet forwarding based on multiple fields in the packet headers. This means that conventional switch engine 102 and routing table 104 are inadequate for considering these different packet header fields in order to forward different types of packets in distinct ways. For example, voice packets may need to be forwarded to one output that is associated with a less congested path and has a quality of service (QoS) guarantee while data packets having the same IP destination address may need to be forwarded to an output associated with a different path that is more congested and has no QoS guarantee. Thus, traditional packet forwarding solely based on IP destination address is insufficient to handle this improved form of packet classification.

A simple packet classification algorithm is to compare an incoming packet against each classification rule sequentially. The complexities of this linear search is O(N) with O(N) memory, where N is the number of rules. The update can be made incrementally by using a binary search in the sorted list of rules in O(logN) time. Note that this algorithm needs the least amount of memory but its query time becomes unacceptable when the number of rules is large, which is the case in most practical applications. To speed up packet classification, more advanced data structures and algorithms should be used. Such advanced data structures will use more memory to store redundant information and thereby speed up packet classification. Clearly, there is a tradeoff between query time and memory size.

The prior art describes a scheme based on bit-parallelism to find the right tradeoff between query time and memory size. The characteristics in packet classifier rule databases (in particular for a firewall application) are taken advantage of in another prior art effort for multiple-stage packet classification. A heuristic approach is also considered in other efforts. Packet classification using tuple space search is given in additional efforts.

Primarily three approaches have been used for packet classification, namely, pure software, pure hardware, and a combination of software and hardware. In packet filtering or firewall applications, a pure software solution has been attempted. The main advantage of this approach is that software is flexible, easy to change and easy to upgrade. Its disadvantages are that software performs poorly, lacks efficiency, and is unable to scale to high-speed interfaces.

Due to high performance requirements and the complexity of the problem, hardware solutions such as a hard-wired ASICs have been pursued for packet classification. One hardware device called a ternary content addressable memory (TCAM), is a special type of fully associative memory where each cell has three logic states: 0, 1 and X (don't care). TCAMs allow a fully parallel search of the classifier database and are popularly used for packet classification. The disadvantages of a pure hardware solution are that hardware is inflexible, difficult to change to accommodate evolving network protocols, and has long development cycles. Furthermore, TCAMs have very high power consumption and support a fewer number of rules.

In next generation routers, a combination of the software and hardware approach is taken in a so-called "network processor", which uses network application specific processors instead of a general-purpose processor. The advantages of this approach are that network processors are programmable, flexible, and can achieve performance comparable to a customized ASIC. This technique also shortens the time to market, can be easily changed or upgraded to accommodate new features or protocols, and adds product differentiation by customers. For example, the nP7120 Packet Processor from MMC Networks supports processing 13 million packets per second (MPPS) with dual 200 MHz processors optimized for packet processing. The IBM Rainier network processor uses 16 RISC cores for MAC & POS framing as well as packet classification with hundreds of rules at 1.6×OC48 speed. ClassiPI from PMC-Sierra uses two million logic gates (plus 2 MB RAM) for packet classification at OC48 speed.

Nevertheless, there remains a need for a high performance packet classification solution that provides an optimal tradeoff between performance and memory size.

SUMMARY OF THE INVENTION

The present invention presents a novel solution for fast packet classification. A novel data structure to store classifier rules is provided which enables fast packet classification, which structure employs bitmaps for each field of the incoming packet for which classification is desired. A fast packet classification algorithm using the novel data structure allows the matching rule with the highest priority to be quickly obtained. A novel rule update algorithm allows new classifier rules to be added into the data structure incrementally. In one practical implementation of a classification engine employing the structures and algorithms of the present invention, a configurable processor with customized instructions is used to accelerate packet classification.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF PRESENTLY PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 2:
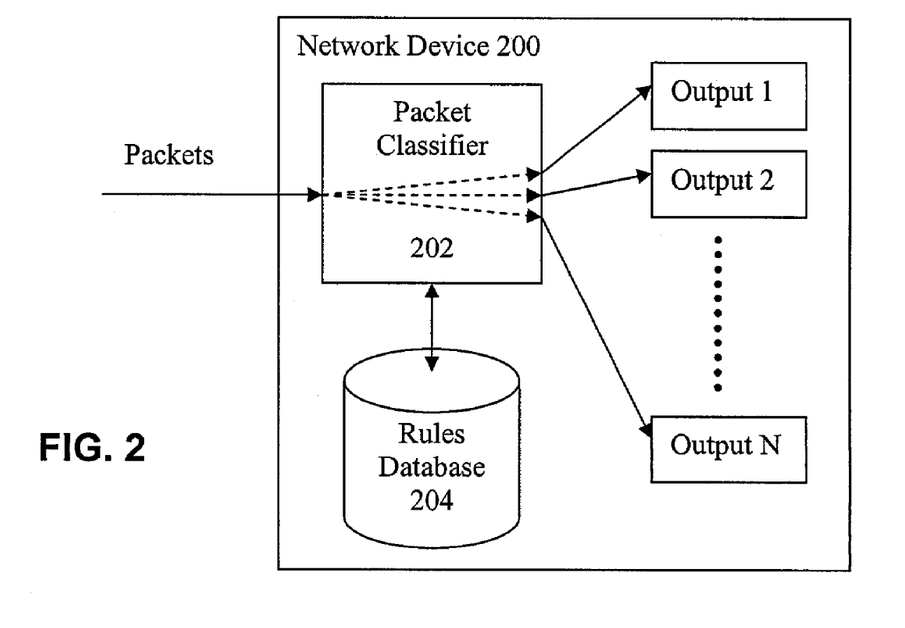
FIG. 2 is a top-level block diagram illustrating a network device employing novel packet classification techniques in accordance with the present invention.

FIG. 2 is a top-level block diagram illustrating a network device 200 in accordance with the present invention. As shown in FIG. 2, in order to support next-generation network services, incoming packets are matched by packet classifier 202 against a rule database 204, which stores the rule information. In addition to classifying packets, new rules may be added to the database or existing rules can be deleted by packet classifier 202. For example, to support per-flow queuing, a new rule may be created once a new connection is established. In this case, new rules will be added quite frequently. Conversely, when existing connections are torn down, the existing rules associated with these connections may need to be deleted from the rule database 204. In an example of network device 200 for firewall and other applications, network device 200 can further include an administrator interface that allows network operators to change/add/remove the rules in the database manually and perhaps less frequently.

In one example embodiment, packet classifier 202 can be implemented by a network processor such as a nP7120 Packet Processor from MMC Networks, the IBM Rainier network processor, or ClassiPI from PMC-Sierra. An alternative embodiment employing a configurable processor such as that provided by Tensilica, Inc. of Santa Clara, Calif. will be described in more detail below.

Rule database 204 need not be a database as that term is generally understood in the art, but can be implemented by any form of recordable media such as internal and/or external RAM, ROM, magnetic and/or optical storage, and possibly combinations thereof. It comprises rules and other tables useful for classifying packets as will be described in more detail below. Accordingly, the preferred actual implementation of database 204 will become apparent from those descriptions.

An example implementation of how rules in rule database 204 are defined will now be described. For example, suppose there are N classifier rules: $R_1, R_2, \ldots, R_N$ and d fields in the incoming packet headers which need to be matched. The $j^{th}$ field has $w_j$ bits. In one possible example, each rule $R_i$ has three associated entries:

Matching criteria for each of the d fields;
$P_i$, the priority associated with $R_i$; and
$A_i$, the action associated with $R_i$.

The criterion for a field specified in each rule indicates which possible field values will be considered matching. For a given field, a rule may specify a wildcard (*), continuous ranges, a prefix, or relational operators (such as >=, >, <, <=), etc. For example, Rule 1 in TABLE I below indicates that the rule will match an incoming packet whose IP source address field has prefix 38.170.141, IP destination address has any value, protocol field is set to 6 (TCP protocol), DSCP field is set to 0, source port number is more than 1023, destination port number is set to 23 (typically used for ftp), and TCP/IP flag is set to 0.

TABLE 1

A Sample of Classifier Rule Database

| Rule# | Src Address  | Dst Address   | Protocol | DSCP | Src Port | Dest Port | Flag | Priority | Action     |
|-------|--------------|---------------|----------|------|----------|-----------|------|----------|------------|
| 1     | 38.170.141.* | *             | 6        | 0    | >1023    | 23        | 0    | 0        | allow      |
| 2     | *            | 38.170/16     | 6        | 0    | 23       | >1023     | 0    | 1        | deny       |
| 3     | *            | 38.170.141    | 6        | 0    | 21       | >1023     | 0    | 2        | allow      |
| 4     | *            | 38.170.141/24 | 6        | 0    | 20       | 6000–6003 | 0    | 3        | join queue |
| 5     | 38.170.141.* | *             | 6        | 0    | >1023    | >20       | 0    | 4        | allow      |
| 6     | 38.170.141.* | *             | 6        | 0    | >1023    | 21        | 0    | 5        | allow      |
| 7     | *            | 38.170.141    | 6        | 0    | 20       | >1023     | 0    | 6        | allow      |
| 8     | 38.170.141.* | *             | 6        | 0    | >1023    | >1023     | 0    | 7        | deny       |
| 9     | *            | 38.170.141    | 6        | 0    | >1023    | >1023     | 0    | 8        | deny       |
| 10    | 38.170.141.* | *             | 6        | 0    | >1023    | 25        | 0    | 9        | allow      |

As mentioned above, each rule also has a priority. When multiple rules are matched for an incoming packet, the matching rule with highest priority will be applied to the packet by packet classifier 202. For purposes of the discussion below, rule $R_i$ has higher priority than $R_j$ if $P_i < P_j$.

The associated action with each rule can cause the packet classifier 202 to permit or deny the packets to go through for a firewall application, or forward the matched packets to a particular queue for QoS guarantee and differentiated services, etc. For example, the associated action for the first rule is to allow any incoming packets matching this rule to pass.

Typically, packet classification involves the matching of many fields. For an IPv4 packet, and as shown in TABLE 1, packet classifier 202 may perform matching of an incoming packet with the following fields: Layer 3—IP source address (32 bits), IP destination address (32 bits), Protocol number (8 bits), and/or Differentiated Service Code Point (DSCP, formerly TOS field): (8 bits); and Layer 4—Source port number (16 bits), Destination port number (16 bits), and/or TCP flags (6 bits). It should be apparent that many different combinations of packet fields to be matched may be desired or preferred, and the present example is meant to be illustrative and not limiting.

If a rule specifies a prefix such as 128.0/16, this can be considered as specifying a range spanning from 128.0.0.0 to 128.0.255.255 (alternatively expressed as [128.0.0.0, 128.0.255.255]). Similarly, a single point such as protocol number 6 can be thought of as specifying a special form of a range represented by [6, 6]. Thus, without loss of generality, classifier 202 assumes that classifier rule $R_i$ specifies matching criteria for each field in ranges of the form $[L_i^1,U_i^1]$, $[L_i^2,U_i^2]$, . . . , $[L_i^d,U_i^d]$, where $L_i^j,U_i^j$ are the values of the lower and upper endpoints, for field j of rule i, respectively. In other words, rule $R_i$ will match any packet if its $j^{th}$ field value falls between $L_i^j$ (inclusive) and $U_i^j$ (inclusive) for j=1, 2, . . . , d. Furthermore, in one possible example, classifier 202 can assume that rules in the rule database are arranged from highest priority to lowest priority, so the priority value need not be explicitly provided.

The packet classification problem is to find the rule with the highest priority (i.e. lowest priority value P and/or the first arranged rule in the database) that matches all the fields in an incoming packet with the criteria specified in the rule. Note that all the fields in an incoming packet will be fully specified. Let $f_j$ denote the $j^{th}$ field of length $w_j$ in the incoming packet for all j's. The packet classification process can then be characterized as finding the index k of the rule $R_i$ such that:

k=arg min $P_i$ subject to $L_i^j \leq f_j \leq U_i^j$, $\forall j$

In other words, if all fields $f_j$ match all associated criteria for a given rule $R_i$, the rule will be applied to the packet if it is the highest priority rule (i.e., k is the index i of the matching rule(s) $R_i$ with the highest priority).

Figure 10:
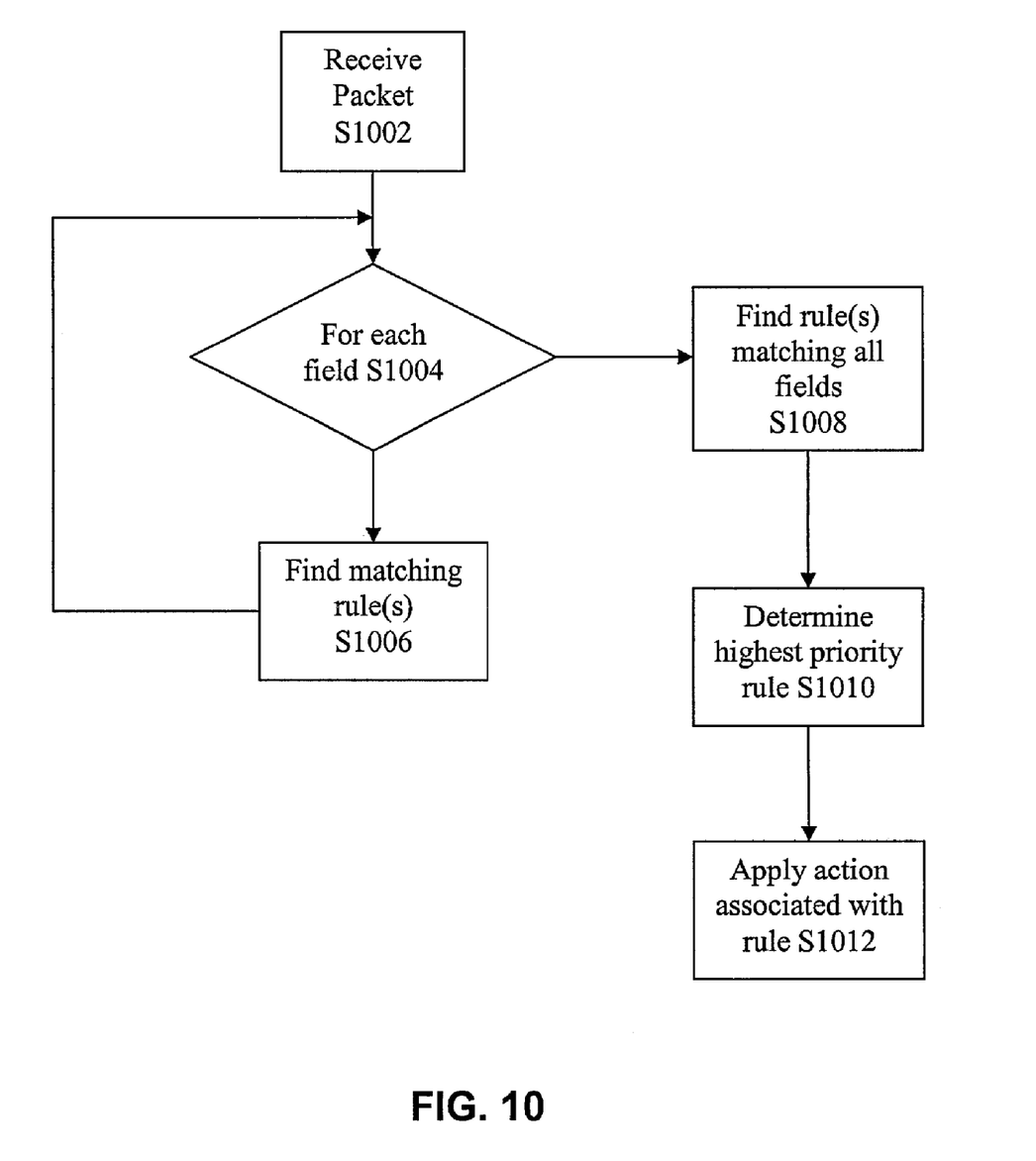
FIG. 10 is a flowchart illustrating an example method for implementing the packet classification algorithm according to the invention.

FIG. 10 is a flowchart illustrating an example method for implementing the packet classification algorithm according to the invention. As shown in FIG. 10, an incoming packet is received in step S1002, and for each field in the packet to be checked (e.g. IP source/destination address, port number, etc.), the matching rule(s) for that field are determined (steps S1004, S1006). After all fields have been compared, the rule(s) that matched all fields are determined in step S1008, and the highest priority rule is found in step S1010. The action associated with that rule is then applied to the packet in step S1012.

Figure 3A:
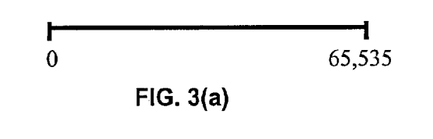
FIG. 3 illustrates how rudimentary intervals are created in an embodiment of the invention.
Figure 3B:
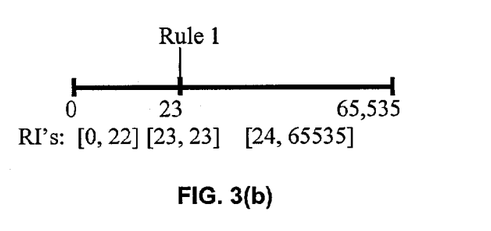
Figure 3C:
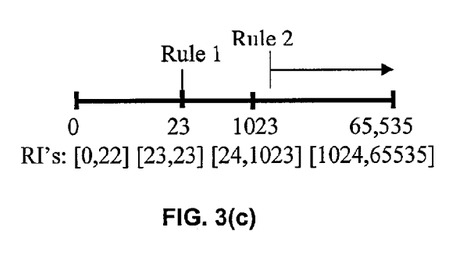
Figure 3D:
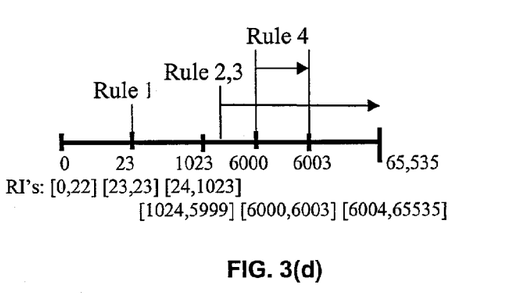

A novel data structure and algorithm for storing rules in rules database 204 in accordance with an aspect of the invention will now be described with reference to the following figures, beginning with FIG. 3. Suppose the width of the $j^{th}$ field in the classifier rule database is $w_j$ bits. Before any rule is added, these $w_j$ bits define a space with $2^{w_j}$ points in the interval $[0, 2^{w_j}-1]$. Let us consider an example where the field is a destination port number with a width of 16 bits. As shown in FIG. 3(a), there are 65,536 discrete points in this space [0, 65535]. When the first rule is added as given in TABLE 1 and shown in FIG. 3(b), this rule specifies a matching criterion (=23) for this field. This divides the original whole space into three portions: [0, 22] [23, 23] and [24, 65535] (i.e., changes the range of the original space and adds two new portions with separate ranges). These ranges may be referred to as "rudimentary intervals" (RIs). For any point in the first portion [0, 22] or third portion [24, 65535] the first rule is not matched while any point in the second portion [23, 23] the first rule is matched. When the second rule (matching criterion>1023) is added as shown in FIG. 3(c), it will divide the third rudimentary interval into 2 RIs, so the space now includes 4 RIs, namely [0, 22], [23, 23], [24, 1023], and [1024, 65535]. For the third rule (>1023) that is translated to the range [1024, 65535], which two endpoints are exactly the same as those of the fourth RI created by the second rule. In this case, no existing RIs are divided. Adding the fourth rule (6000–6003) will divide the fourth RI into three RIs: [1024, 5999], [6000, 6003], and [6004, 65535].

From the above description it can be shown that there is a bound on the number of RIs for a given field and rule. Originally when there are no rules, there is a single RI spanning the entire range. When a new rule is added, it will add at most two new RIs. Therefore, for N rules, the total number of RIs is upper bounded by 2N+1. TABLE 2 below gives the actual number of routes from Network Access Points (NAPs) including Mae-East, Mae-West, AADs, Pac-Bell, and Paix collected on a particular date and provided by IPMA. Through analyzing these routing table traces, one can compute the number of rudimentary intervals created by these IP destination addresses in the routing traces. It is found that, as expected, the number of RIs is between N and 2N where N is the number of routes in the routing table.

TABLE 2

Number of Routes (class A, B, C), RIs and Ratio

| NAP | Mae-East | Mae-West | AADS | PacBell | Paix |
|---|---|---|---|---|---|
| # of Routes | 19003 | 23138 | 28729 | 36556 | 40757 |
| # of RIs | 30598 | 36057 | 44810 | 56514 | 58465 |
| Ratio | 1.61 | 1.56 | 1.56 | 1.55 | 1.43 |

For each RI created as described in connection with FIG. 3, a bitmap can be created and stored representing the specific rules matched and not matched in that interval. Specifically, for each rule, there is an associated bit to indicate whether this rule is matched (denoted by "1") or not ("0"). So, for N rules, a N-bit bitmap can be used to represent which corresponding rules are matched and which rules are not matched. For instance, for the first RI covering the interval [0, 22] in the above example, the bitmap would be $0000_b$ because none of the four rules have a matching criterion in this range. For the interval [23, 23], the bitmap is $1000_b$ because the first rule (corresponding to the first bit position) specifies a matching criterion of 23. For [24, 1023] the bitmap is $0000_b$, and for [1024, 5999] the bitmap is $0110_b$, because both the second and third rules have matching criteria in this range. Similarly, for [6000, 6003] the bitmap is $0111_b$, and for [6004, 65535] the bitmap is $0110_b$.

An incoming packet contains all the fields that need to be matched against the classifier rule database. In one example implementation, for each field that needs to be matched, three tables are maintained in database 104: namely a rule information base (RIB) table, a bitmap (BMP) table, and an endpoints (EP) table, which tables are shown in FIG. 5 and whose contents will be described in more detail below.

Consider an incoming packet with $w_j$ bits in its $j^{th}$ field. If $w_j$ is not too large, a flat RIB table with $2^{w_j}$ entries can be used. If this is the case, these $w_j$ bits can be used entirely as an index into the RIB table. For example, for the protocol number field with 8 bits, the flat RIB table has 256 entries covering the points from 0 to 255. The full 8 bits in the packet header can thus be used itself as an index to identify a unique entry in the RIB table. For the fields of protocol number, DSCP field, source port number, destination port number and TCP flags, which have no more than 16 bits, flat tables of 65,536 entries each can be used. For the IP source and destination address fields that have 32 bits, hierarchical tables may be used to prevent an enormous memory requirement. There exist a variety of hierarchical data structures for IP routing table lookup, and these data structures can be used for packet classification as well.

For example, one data structure is called 24/8, which uses the most significant 24 bits as an index into a first level table while the remaining 8 bits act as an offset index into a second level table. A more advanced and compact data structure called 16/K uses the most significant 16 bits of IP addresses as an index into the first level table while the remaining K bits (where the value of K can be different from one 16 bit prefix to another 16 bit prefix) are used as an offset index into the second level table. These data structures are described in more detail in the afore-mentioned related applications, and so further details thereof will be omitted here so as not to obscure the present invention.

Figure 5:
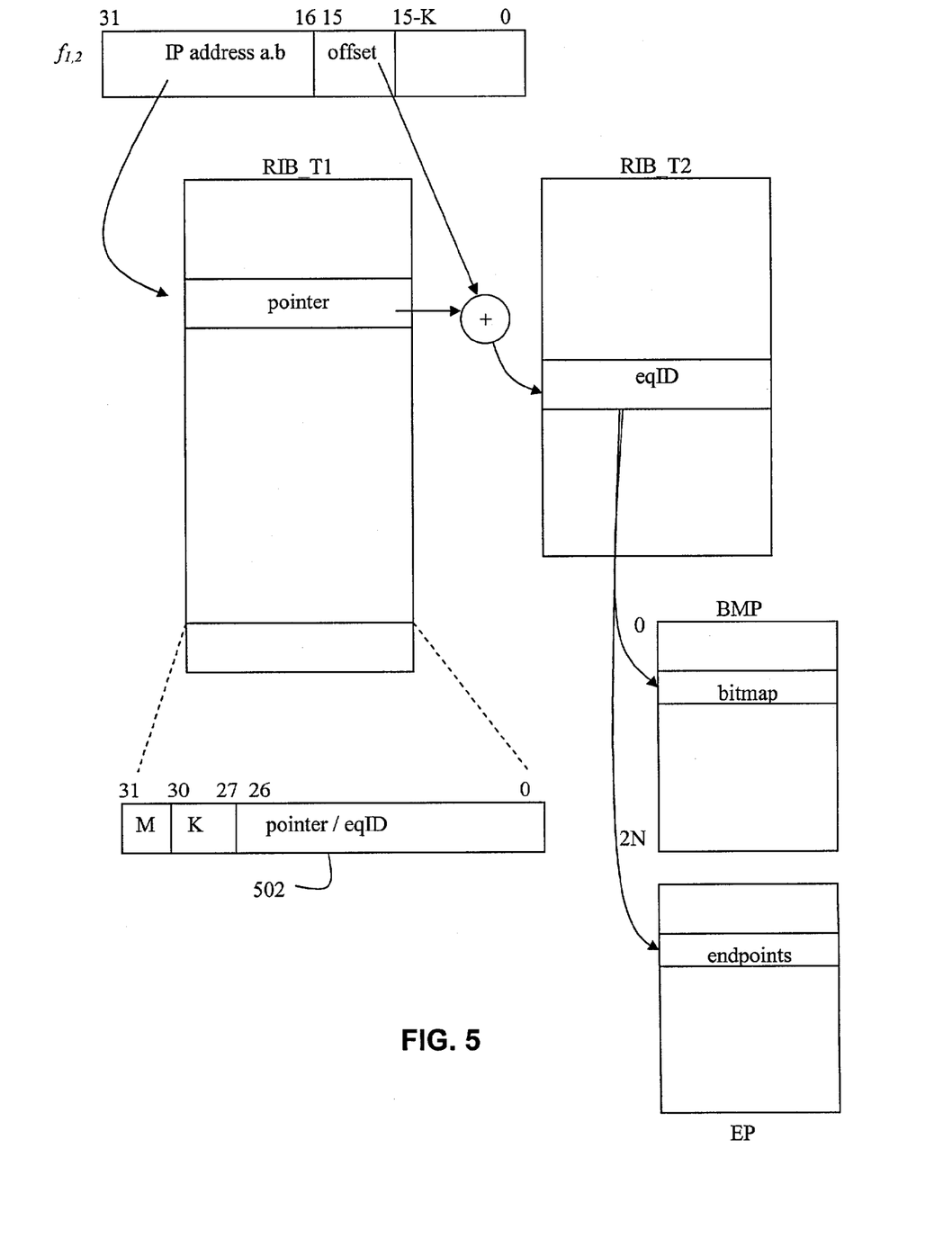
FIG. 5 shows data structures for classification of IP address fields in accordance with one possible implementation of the invention.

In one example implementation shown in FIG. 5, the first two fields of IP source and destination addresses ($f_{1,2}$) in the classifier rule database 104 are given in prefix format. For these two fields, the 16/K data structure is used, where two hierarchical tables, namely RIB_T1 and RIB_T2, are maintained. As shown, each entry 502 in the first level table RIB_T1 has 32 bits with the most significant bit used as a marker bit to indicate whether the equivalent identifier (to be explained below) is stored in this entry (if the marker bit is 0) or in the second level table RIB_T2 (if the marker bit is 1). The following 4 bits in the RIB_T1 entry stores the value of K (defined below) and the remaining 27 bits store a pointer into the second level table RIB_T2. For each entry in the RIB_T1 table, an integer K, that is in the range from 1 to 16, is defined.

Consider an entry indexed by i (representing a 16 bit prefix of the dot format a.b) in RIB_T1. The maximum prefix length, say, pl_max[i], is found for all the rules in the classifier database whose prefix begins with the 16 bits a.b. If this maximum prefix length is no more than 16, then the marker bit in this RIB_T1 entry is 0 and its K value is not defined. Otherwise, the K value is K[i]=pl_max[i]−16. If K[i] is defined, the value of K[i]−1 will be stored at the bits RIB_T1[30:27] at the entry indexed by i. In the example of the classifier rules shown in TABLE 1, for the field of IP destination address the maximum prefix length for the 16-bit prefix 38.170 is 24. In this case, the K value is K[38.170]=8. For more details regarding 16/K data structures, see the aforementioned related patent applications.

In theory it is possible to store the N-bit bitmap, which indicates those rules matched or not matched, at each entry of the RIB table. For a flat RIB table, this would require $2^{w_j}*N$ bits of memory. However, in practice this can be done in a different way to reduce the amount of memory required. More specifically, as noted earlier, there are no more than 2N+1 rudimentary intervals (RIs). This implies that there are no more than 2N+1 bitmaps. Thus one only needs to use log(2N+1) bits to index these bitmaps. For each rudimentary interval that is associated with a bitmap, one can use an equivalent identifier (eqID) (the concept of equivalent identifier is introduced in Gupta et al., "Packet Classification on Multiple Fields", Proc. ACM SIGCOMM, September 1999, where a distinct eqID is used only for distinct bitmap patterns; we may use distinct eqIDs for the same bitmap patterns) ranging from 0 to 2N to represent the actual bitmap. Therefore, each entry in the RIB table or tables stores eqID, which is used as an index into the BMP table that stores the actual bitmap. For a flat RIB table, this would require $2^{w_j}*\log(2N+1)$ bits. In other words, there are $2^{w_j}$ entries in the RIB table for field j, with each entry storing eqID, which is log(2N+1) bits long.

The BMP table has no more than 2N+1 entries with each entry having N bits, with N being the number of rules. In total, the BMP table requires (2N+1)N bits. For each entry in the BMP table there is a corresponding entry in the EP table, which stores the lower and upper endpoints for each rudimentary interval. The EP table is only needed for adding and deleting a classifier rule to and from the database. The EP table is not used for classifying an incoming packet. Therefore, the EP table can be stored in external memory with relatively long latency without affecting the packet classification performance. For fast packet classification the RIB and BMP tables are preferably stored on-chip or in memory with low latency.

An example implementation of a packet classification algorithm in accordance with the invention will now be described with reference to FIG. 5.

Consider an incoming packet having d fields with field values $f_j$, for j=1, 2, ... d. Without loss of generality, assume that the first two fields (e.g., IP source and destination addresses) have more bits than desired for a maximum flat memory, and thus require the 16/K data structure for RIB tables. The remaining fields have fewer bits and only need flat RIB tables, and so the algorithm for matching those fields will become apparent after the following illustration. For each of the first two fields $f_1$, $f_2$ requiring the 16/K RIB table, the significant 16 bits are obtained from $f_j$ and used to get the corresponding RIB_T1 entry. If the marker bit in the RIB_T1 entry is 0, then the lower 27 bits store an eqID. Otherwise, it is necessary to get the K value from the RIB_T1 entry (from bit 30 to 27) and the base pointer from the RIB_T1 entry (from bit 26 to 0).

Next, the K bits following the most significant 16 bits are extracted from $f_j$ as an offset. The actual address of the RIB_T2 entry can then be computed by summing the base pointer and the offset and the eqID can be loaded. Once the eqID is retrieved, the N-bit bitmap can be directly loaded from the BMP table.

For all the other fields that have flat RIB tables (e.g. j≠1 or 2, or non-32 bit fields), a direct load of the RIB entry, which always includes an eqID pointing to the BMP entry, is performed to find the bitmap. The bitmap will be incrementally bit-wise ANDed with the previous bitmap. This process continues for all the fields. At the end, by scanning through the final bitmap from left to right, we find the leftmost bit position where the first one occurs in the bitmap. In an example implementation where priority is defined by the order of the rules in the database, this gives the highest priority rule matching the incoming packet. It should be apparent, however, that other implementations where priority is expressly provided are possible, and those skilled in the art will understand how to make modifications in accordance with such alternative implementations.

An example of pseudocode for implementing the packet classification algorithm is given below in TABLE 3.

TABLE 3

```
bmp = 111..........1; // initially set the N-bit bitmaps with all ones
for j = 1, 2 {
    // get the equivalent ID stored at hierarchical 16/K RIB table
    prefix = f_j [31:16]; // get the significant 16 bits
    t1_result [31:0] = RIB_T1 [j] [prefix]; // get RIB_T1 entry
    if (t1_result [31] == 0) // marker bit is 0
        eqID = t1_result [26:0]; // eqID is stored at the lower 27 bits
    else { // marker bit is 1
        K = t1_result [30:27] + 1; // get the K value
```

TABLE 3-continued

```
        offset = f_j [15:16-K]; // get the K bits following the prefix
        t2_index = t1_result [26:0] + offset; //compute the RIB_T2
        address eqID = RIB_T2 [j] [t2_index];
    }
    bmp &= BMP [j] [eqID]; // bit-wise AND with the previous bitmap
}
for j = 3, ..., d {
    // get the equivalent ID stored at a flat RIB table
    eqID = RIB [j] [f_j];
    bmp &= BMP [j] [eqID];
}
find the position of left most 1 appearing in the bmp;
```

An example method of initializing and changing the RIB, BMP and EP tables when adding a new classifier rule will now be discussed. In this example, an efficient algorithm is presented to change the data structure incrementally.

Initially, before any rule is added into the database 104, all the entries in the RIB table for each field j are set to zeroes, the BMP table is set to contain one entry with a bitmap of all zeroes, and the EP table is set to contain one entry with endpoints $[0, 2^{w_j}-1]$. To simplify the algorithm description, a flat RIB table will be assumed. The update algorithm for a hierarchical RIB table such as 16/K is very similar and will become apparent to those skilled in the art after being taught by the present example in conjunction with the incorporated applications.

When classifying a field of width w, there will be $2^w$ entries in a flat table where each entry is associated with some representation indicating which rules span over that entry (in this case, a bitmap). As previously mentioned and as illustrated in FIG. 3, this entire space can be thought of as partitioned into non-overlapping rudimentary intervals where all points within each interval have the same rule(s), if any, associated with them. With this view of the flat space, a new rule that is to be inserted into the classifier will have a beginning point that either begins within an existing rudimentary interval or at the same point as the rudimentary interval. Furthermore, the new rule will either end within the same existing rudimentary interval, outside the rudimentary interval, or exactly on the end of the rudimentary interval.

What follows is a description of an example of a recursive algorithm to incrementally update the classifier. For the purpose of this algorithm, there are four cases that may occur as referred to above, and as shown below. The example methods for updating the classifier for each of these cases will be considered separately. In the following description, L and U refer to the Lower and Upper bounds, respectively, of a new rule that is to be added to the classifier. Bi and Ei refer to the beginning and end points, respectively, for the $i^{th}$ rudimentary interval which this new rule begins within or at. Pseudo code for this algorithm can be found in the incorporated priority application.

Figure 4A:
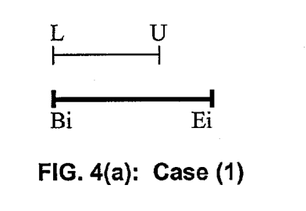
FIG. 4 shows rule addition cases in an accordance with a rule update algorithm embodiment of the invention.

Case 1—(L==Bi) && (U<Ei)

As shown in FIG. 4(a), if L is equal to the start Bi of a rudimentary interval but U is less than the end point Ei of this rudimentary interval then this rule is completely enclosed within the existing rudimentary interval and its addition will result in the creation of one new rudimentary interval.

For the range between Bi and U, the existing bitmap referenced by the eqID in each of the entries in the RIB table corresponding to this region has a one turned on at the corresponding bit position to signify the additional presence of this rule within the existing rudimentary interval. Furthermore, the endpoint Ei for the existing rudimentary region is changed to U in the EP table. For entries from U+1 to Ei within the RIB table, a new bitmap is created and referenced by a new eqID within this region. A duplicate copy of the original bitmap, with the bit corresponding to this specific rule turned off, is added to the BMP table at the new eqID. This new bitmap corresponds to a new RI creation and endpoints of U+1 and Ei are added to the EP table at the new eqID for this new RI.

Figure 4B:
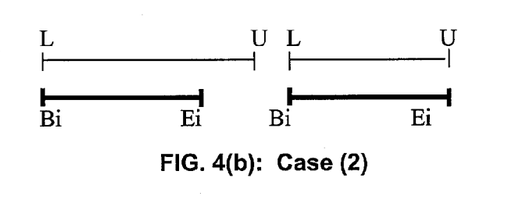

Case 2—(L==Bi)&&(U>=Ei)

This case corresponds to the situation shown in FIG. 4(b) where again the new rule begins exactly on the beginning of a rudimentary interval but the end of the rule is either at the end of the current interval or beyond the end of the interval. Regardless of the endpoint of the new rule, the current rudimentary interval is completely eclipsed. Thus, the bitmap in the BMP table at the eqID corresponding to this interval has the bit corresponding to this new rule turned on. In the case where the U=Ei, the end points of the current interval are not changing; thus, the EP table does not need to be modified.

If the new rule spans beyond the end of this rudimentary interval (i.e., U>Ei), the remaining addition of this rule to the RIB table can be thought of as adding the same rule but now spanning from [Ei+1, U]. The point Ei+1 corresponds to the beginning point Bi' of the next adjacent existing rudimentary interval. U will thus fall within or totally eclipse the next adjacent existing rudimentary interval. Therefore, one or more recursive calls to the RIB table update procedure described above and/or in connection with FIG. 4(a) with these modified end points will continue and complete the insertion process.

Figure 4C:
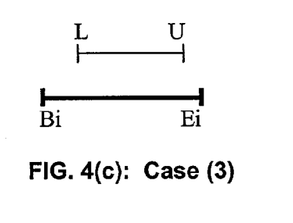

Case 3—(L>Bi) && (U<Ei)

As shown in FIG. 4(c), when the new rule is completely contained within an existing rudimentary interval, two completely new intervals are created. When complete, the original rudimentary region will be split into a leftmost region, the center region corresponding to the new rule, and a rightmost region. To update the data structures for this case, the existing interval to which the beginning point of the rule is mapped to has its endpoint modified to L−1 in the EP table. This leftmost interval does not contain the new rule. Because of this, the bitmap for this interval does not need to be modified. Secondly, two new intervals need to be created by creating two new bit maps in the BMP table and two new entries in the EP table. These bitmaps are initially duplicates of the leftmost interval. The first duplicate will be used to represent the middle interval and the bit in the bitmap corresponding to this new rule are turned on. The beginning and the endpoints of this middle interval are set in the EP table to L and U. All entries in the RIB table from L to U are updated to reflect the new eqID of this bitmap/interval. Lastly, all the entries from U+1 to Ei in the RIB table are changed to reflect the eqID of this second new bitmap/rudimentary interval. Again, the EP table is updated to reflect the beginning and end points of this new rudimentary region, [U+1, Ei].

Figure 4D:
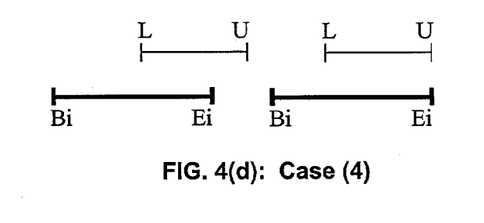

Case 4—(L>Bi) && (U>=Ei)

When the new rule begins within the current rudimentary interval and either ends on the upper endpoint of the current rudimentary interval or beyond the current rudimentary interval, at least one new rudimentary interval needs to be created. Similar to Case 3, the area of the original rudimentary interval before the beginning of the new rule is to retain its eqID identity with no changes to its bitmap. This is because the new rule does not reside in this region. However, the new rule does change the endpoint of this original interval from Ei to L−1 in the EP table. Next, a new rudimentary interval with end points of L and Ei is to be created that derives its bitmap from its neighboring left interval. However, because the new rule resides in this interval, the bit corresponding to this new rule is turned on. Furthermore, the entries in the RIB table from L to Ei need to be changed to reflect the eqID of this new rudimentary interval/bitmap and the endpoints of [L, Ei] need to be added to the EP table. Lastly, if the new rule extends beyond the boundaries of the original rudimentary interval and into an adjacent rudimentary interval, further changes have to be made to the RIB table. This can be accomplished recursively by calling this update function again with modified endpoints for the rule being added. As discussed above in connection with Case 2, the RIB table update procedures for Case 1 and/or Case 2 should be called recursively with endpoints of [Ei+1,U] and the same rule number.

Figure 6:
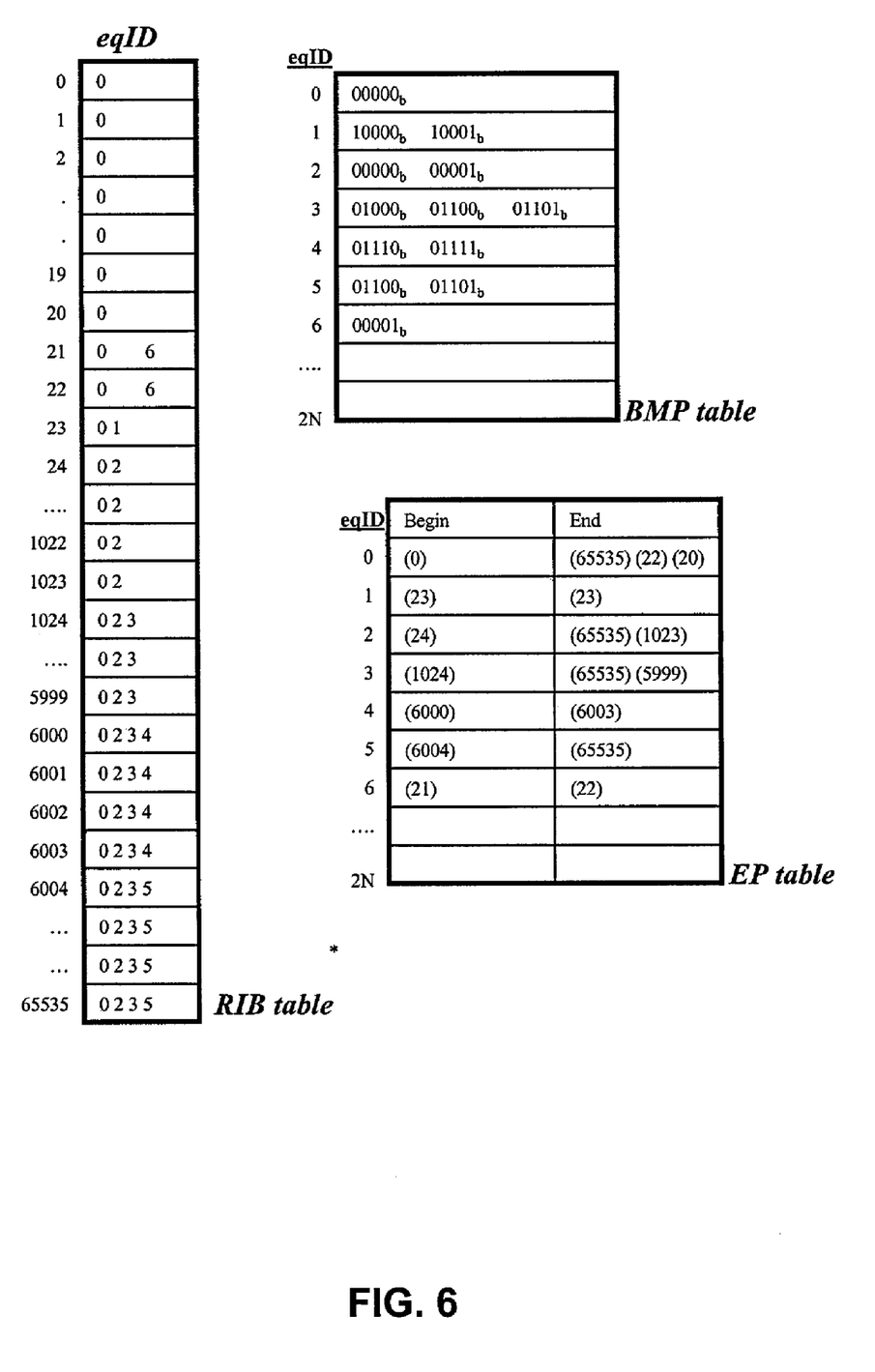
FIG. 6 shows an example of a rule update algorithm in an accordance with the present invention.

As an example of the above algorithm, how the data structures for the destination port number field are changed when the first five rules of TABLE 1 are added to the database will be described below in connection with FIG. 6. Initially, there is only one rudimentary interval where no rules apply. As shown in FIG. 6, the RIB table is initially set to all zeroes, the BMP table is initially set to contain a single bitmap $00000_b$ at eqID 0, and the EP table is set to [0, 65535], the endpoints of the single rudimentary region at eqID 0.

Referring to TABLE 1, rule 1 specifies a matching criterion of 23 for the destination port number. This is interpreted as having two endpoints: L=23, U=23. A lookup in the RIB table is performed to find that the eqID in the L-th RIB entry is 0. From the EP table the endpoints of the RI associated with this eqID (0) are found: $B_0=0$, $E_0=65535$. This corresponds to Case 3 described above. After this rule is added, three rudimentary intervals will exist.

First, the endpoints of the RI associated with eqID of 0 are adjusted to range from [0, 22] in the EP table and two new intervals are created with eqIDs of 1 and 2 with ranges of [23, 23] and [24, 65535] respectively. Furthermore, two new bitmaps are created to represent the rules within these intervals. Both are duplicates of the bitmap for eqID 0. The bitmap for eqID 1 then has a 1 inserted into its first bit position to indicate that Rule 1 is present within this region. The entry for L=U=23 in the RIB table is changed to 1 to become associated with the first newly created rudimentary interval with eqID of 1, and entries for 24 through 65535 are changed to 2 to become associated with the second newly created rudimentary interval with eqID of 2.

Rule 2 gives two endpoints: L=1024, U=65535. A lookup in the RIB table is carried out to find that the eqID in the L-th RIB entry is 2. The EP table gives the endpoints of the RI in which Rule 2 begins: $B_2=24$, $E_2=65535$. This corresponds to Case 4. After this rule is added, four rudimentary intervals will exist.

First, the EP table needs to be modified to reflect the interval with eqID 2 will now be ending at 1023 instead of 65535. Next, a new rudimentary interval ranging from [1024, 65535] needs to be created. As shown in FIG. 6, this new interval has an eqID 3. Its endpoints of [1024, 65535] are added to the EP table and the RIB table is updated to reference this RI for each entry between [1024, 65536]. Further, a new bitmap is added to the BMP table corresponding to the new RI. The BMP for the original RI is taken and a 1 is inserted at the second bit position yielding $01000_b$ at entry for eqID=3 in the BMP table.

Rule 3 has two endpoints: L=1024, U=65535. The addition of this rule maps to RI 3 with range [1024, 65535] and thus the addition of this rule falls under Case 2. In this case, the structure of the rudimentary intervals is not going to change. Instead, only the BMP table needs to be updated to reflect that a new rule covers RI 3. Thus the bitmap for RI 3 has a bit turned on at bit position 3, changing the bitmap from $01000_b$ to $01100_b$.

Rule 4 gives two endpoints: L=6000, U=6003. A lookup in the RIB table is performed to find that the eqID in the L-th RIB entry is 3. The EP table gives the endpoints for this RI in which Rule 4 begins: $B_3=1024$, $E_3=65535$. The addition of this rule thus falls under Case 3.

First, the endpoint of the RI 3 is adjusted to range from [1024, 5999] in the EP table and two new intervals are created with eqIDs of 4 and 5 and ranges in the EP table of [6000, 6003] and [6004, 65535] respectively. Next, two new bitmaps are created to represent the rules within these intervals. Both are duplicates of the bitmap for eqID of 3. The bitmap for eqID of 4 then has a 1 inserted into its fourth bit position to indicate rule 4 is present within this region. Further, the RIB table entries in the range [6000, 6003] are adjusted to reflect the newly created RI having eqID of 4, and the RIB table entries in the range [6004, 65535] are adjusted to reflect the newly created RI having eqID of 5.

Referring to TABLE 1, rule 5 gives two endpoints: L=21, U=65535. A lookup in the RIB table is performed to find that the eqID in the L-th RIB entry is 0. The EP table gives the endpoints for this eqID as $B_0=0$, $E_0=22$. The addition of Rule 5 thus falls in Case 4. This rule begins within the RI with eqID 0 and terminates beyond the end of this interval.

First, entry 0 in the EP table is modified so that the end point for eqID 0 will now be 20. Having shorted the first RI, a new RI is created with eqID 6. The endpoints of [21, 22] are entered into the EP table and a new bitmap is created in the BMP table by duplicating the bitmap for eqID 0. The bit in position 5 in this bitmap is then turned on to signify that rule 5 covers this new rudimentary interval. Next, the RIB table is updated from entries 21 to 22 to reflect this new RI's eqID of 6. Lastly, because this rule extends beyond the end of the current RI, one or more recursive calls are necessary where the endpoints of the rule are now $[E_3+1, U]=[23, 65535]$. The recursive calls will all be for Case 2 (the new rule completely extends over each adjacent rudimentary interval). Accordingly, the fifth bit in each of the bitmaps corresponding to the remaining rudimentary intervals in the BMP table will be set (eqIDs=1 to 5).

It should be apparent that the above processing is intended as illustrative rather than limiting, and that various modifications can be made thereto, and such are considered alternative embodiments within the scope of the invention. For example, in the description of the previous four cases, the addition of a rule sometimes (cases 1, 3 and 4) caused the modification of one rudimentary interval and the creation of a new rudimentary interval. This creation of a new interval requires changing the eqID present in a range of the RIB table to reflect this new interval. In practice, the algorithm can be improved more efficiently to minimize memory accesses.

For instance in Case 1, it was stated that the leftmost interval should have its bitmap modified while the interval to the right should correspond to a new BMP/RI. However, if the left most interval was significantly smaller than the right interval, it would be desirable to instead make the leftmost interval correspond to the creation of a new eqID. This would minimize the amount of changes to the RIB table and thus the number of memory accesses. Thus the Case 1 would instead require the creation of a new bitmap with the bit corresponding to the new rule set to 1. Then the entries in the RIB table from L to U would be changed to reflect the eqID of this new rudimentary interval/bitmap. The bitmap corresponding to the rightmost interval would remain unchanged. This technique can be applied to speed up the other cases as well.

The classifier rule update algorithm can be further refined to prevent creating a new eqID for bitmaps with the same pattern, for example.

Figure 11:
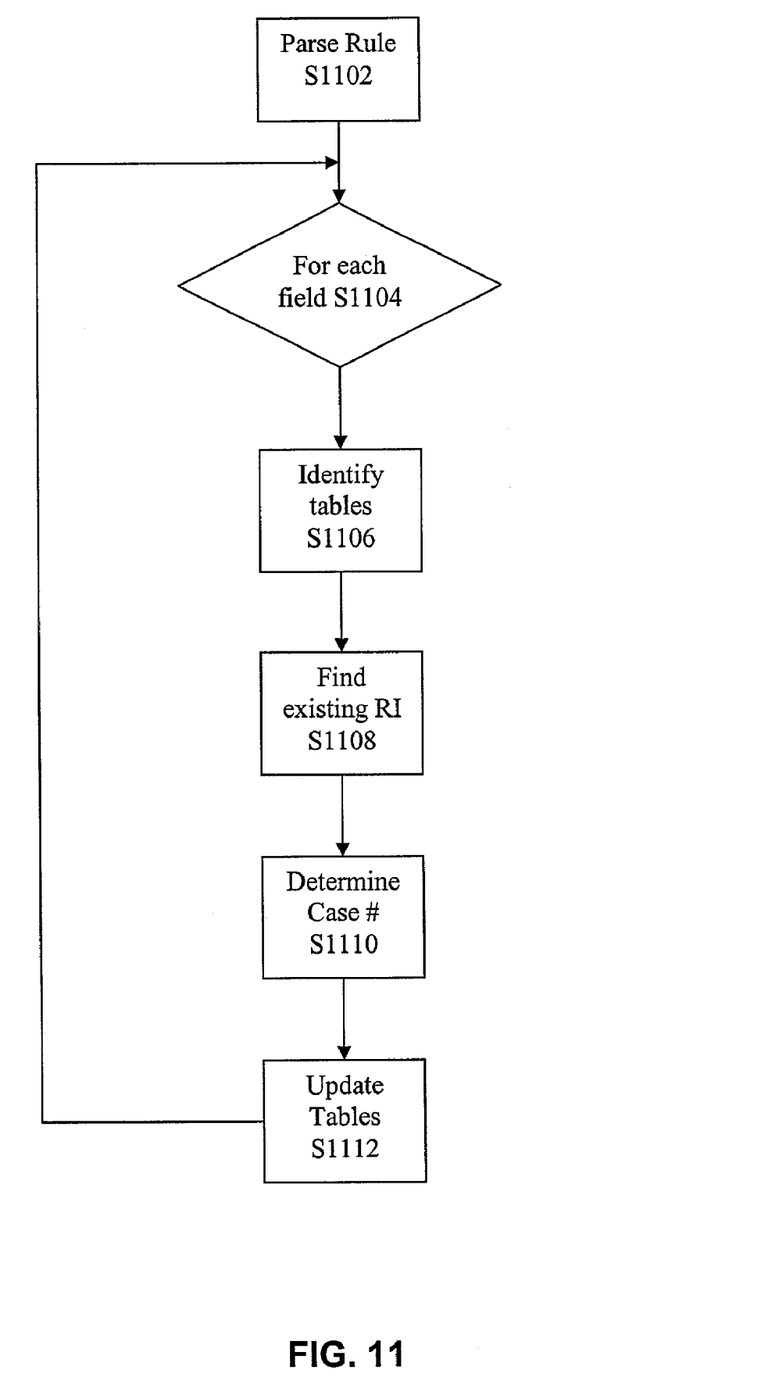
FIG. 11 is a flowchart illustrating an example method for implementing the incremental rule update algorithm in accordance with the invention.

FIG. 11 is a flowchart illustrating an example method for implementing the incremental rule update algorithm in accordance with the invention. As shown in FIG. 11, when a new rule is received, in step S1102 it is parsed into matching ranges for each field (e.g. port number=1023 gives a range of L=1023, U=1023). Then for each field (loop starting in S1104), the tables associated with the field (RIB, BMP and EP tables) are identified. Then the starting point for the new rule is compared to find the eqID of the existing rudimentary interval where the rule falls (step S1108), and then the endpoints of the existing RI are found to determine the case (e.g. 1 to 4) for performing the rule update (step S1110). The rule table update processing described above is then performed, depending on the case (S1112).

Figure 7:
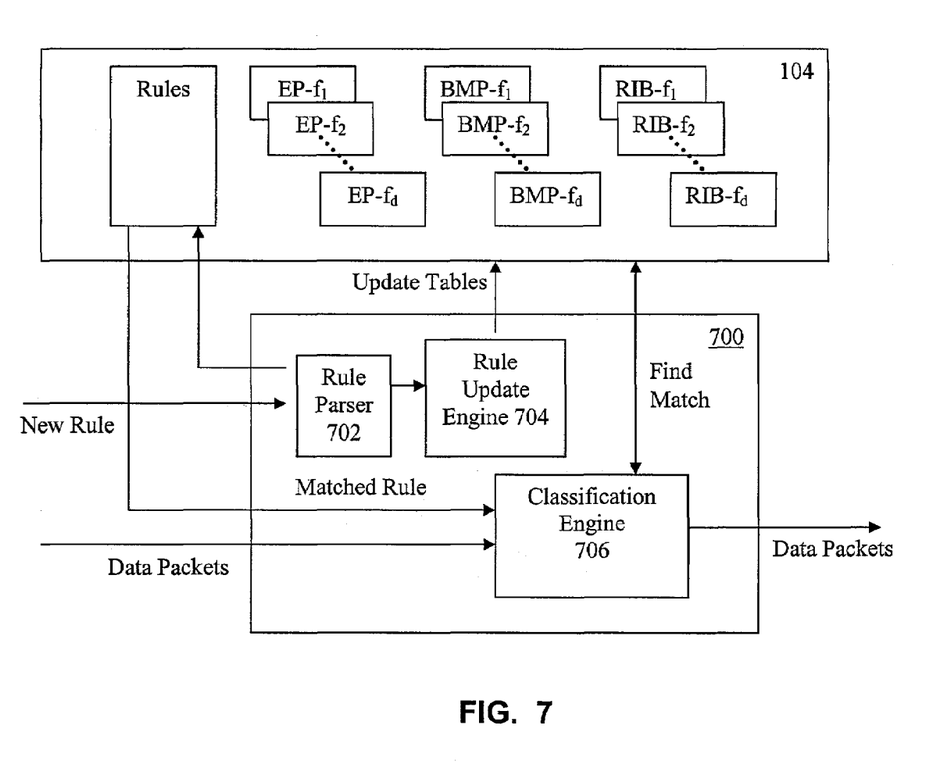
FIG. 7 is a block diagram further illustrating an implementation of a packet classifier in accordance with the present invention.

An example implementation of a packet classifier 700 in accordance with the principles of the invention will now be described with reference to FIG. 7. As shown in FIG. 7, classifier 700 includes a rule parser 702, a rule update engine 704 and a classification engine 706.

Rule parser 702 translates new classification rules expressed in arithmetic (e.g. MASK or prefix) or relational (>=, <=, >, <) format to ranges and provides the ranges to the rule update engine for updating the tables in rules database 104. Rule parser 702 also stores the action and priority associated with the rule in a rule table. It should be noted that new rules can be received in a variety of ways. For example, the network device can include an administrator interface that allows an administrator to enter new rules manually through a user interface. New rules can also be received automatically, for example, the network device can detect when new connections or flows are established and form a rule based on a service level agreement (SLA). As another example, rules can be added, deleted and/or changed at a faster pace by network management systems through peer-to-peer protocol of messaging instead of manually. The variety of ways new rules can be received are considered incidental to the present invention, and so even further detailed description thereof will be omitted here.

Rule update engine 704 receives the ranges of the new rule and the associated field to which the range applies. Rule update engine 704 then finds the existing rudimentary interval in which the new rule to be added falls and performs the appropriate rule update algorithm as described above and in accordance with the data structure employed for the field (can be either 24/8, 24/8c, 16/K or 16/Kc or any customized data structure which is appropriate for the applications).

Classification engine 706 receives incoming packets and performs the classification algorithm described above against the packet header fields so as to identify the matched rule with highest priority for the packet. Once the rule is identified, it handles the packet in accordance with the action associated with the rule.

In one possible implementation of the classification engine, it is any platform that supports C programs, such as a conventional network processor. In such an implementation, the classification algorithm requires hundreds of instructions for each incoming packet. For example, to find the position of the leftmost one appearing in a bitmap alone may take dozens of instructions. To find the eqID stored in a 16/K data structure also takes a few dozen instructions.

In a preferred implementation of the classification engine, it is embodied by an Xtensa configurable processor from Tensilica, Incorporated of Santa Clara, Calif. Xtensa is a configurable microprocessor that can be tailored and optimized for packet classification with proper configurations and customized instructions. The processor is chosen to have a 128 bit processor interface width, cache size of 16 KB, cache line size of 16 bytes, and 32 registers (plus a set of special user defined states or registers). To accelerate packet classification, a half dozen customized instructions are developed. A description of these customized instructions is provided below. Those skilled in the art will recognize how to implement an Xtensa processor with customized instructions after being taught by the examples below and using available resources from Tensilica, Incorporated and techniques described in U.S. Pat. Nos. 6,477,683, 6,701,515, 6,477,697 and U.S. Pat. No. 7,036,106, all commonly owned by the present assignee and incorporated herein by reference.

LOAD_PKT(<pkt_address>, <constant_offset>):Load_PKT is used to load the relevant fields from the incoming packet for classification. Numerous fields can be loaded within one call. The first field is returned as a result of calling this instruction while the other fields are stored in special internal hardware states (or registers) for later use. <pkt_address> is the base address of the packet while <constant_offset> is an offset (in bytes) to be added to this base address (for cases where a second load may be necessary to load the remaining relevant fields).

T1_LOOKUP(<L1_addr>, <field_index>):T1_LOOKUP performs a load from within the first level of a 16/K data structure. Given the base address <L1_addr> to the first level table and the <field_index>, it loads the proper entry using the most significant 16 bits of the field as an index. The instruction returns either the <eq_id> index into the BMP table or the pointer to the second level table that needs to be searched.

T2_LOOKUP(<eq_id or pointer>, <field_index>): T2_LOOKUP conditionally performs a load into a second level of tables within the 16/K data structure. If <eq_id or pointer> is actually an <eq_id> then this value is returned and no access to the second level table is initiated. If it is a <pointer> then a memory access takes place and the proper table of bitmaps index <eq_id> is loaded from the second level table. The appropriate offset into this table is calculated by the K bits following the significant 16 bits from the special states indexed by <field_index > where K value is from the information returned as a result to the T1_LOOKUP instruction.

BMP_INTERSECTION(<eq_id>): BMP_INTERSECTION loads from memory the appropriate bitmap stored in the table for the current field being classified. The base address is stored in special internal state configured at setup time while the index into this table is <eq_id>. After the bitmap has been loaded, it is bitwise ANDed with a internally held bitmap representing the subset of rules that are potential matches thus far. Successive calls to this instruction have the effect of narrowing down the subset of matched rules.

GET_EQID(<flat_table_base_addr>, <field_index>): GET_EQID is used to retrieve <eq_id>, the index for the specific bitmap representing which rules cover the value stored in the packet field indexed by <field_index>. This instruction is utilized when a flat table is used instead of some other non-flat data structure (perhaps 16/k, 24/8, etc).

SELECT_RULE ( ): SELECT_RULE returns the index of the highest priority (lowest rule number) rule that has been matched by all successive calls to BMP_INTERSECTION. Furthermore, it reinitializes the internal state representing the rules "matched thus far" to all ones (all matched).

The above customized instructions are incorporated in the optimized C code below. First, the necessary fields of the packet are loaded into internal state of the processor.

For 32 bit fields, each index into the BMP table is attained by two load instructions, T1_LOOKUP and T2_LOOKUP. For smaller fields, a flat table is used and the special instruction GET_EQID is used. In each respective case, after the index into the BMP table is attained, the BMP_INTERSECTION instruction is used which computes a new bitmap of all possible rules where a match can exist. It does so by loading the bitmap specified by eq_id and stores in internal state the bitwise AND of this new bitmap of rules and the current 'running' bitmap. Lastly, SELECT_RULE is called which returns the index of the highest priority bit that is currently set in the 'running bitmap' computed by BMP_INTERSECTION. This is the highest priority rule that is matched.

```
// Load first 128 bits of packet header into internal state and
// return the first field for classification.
LOAD_PKT (&packet, 0);
// Perform packet classification based on 32 bit Source Address
eq_id = T1_LOOKUP (SRC_ADDR_DB_local, 0);
eq_id = T2_LOOKUP (eq_id, 0);
BMP_INTERSECTION (eq_id);
// Perform packet classification based on 32 bit Destination Address
eq_id = T1_LOOKUP (DST_ADDR_DB_local, 1);
eq_id = T2_LOOKUP (eq_id, 1);
BMP_INTERSECTION (eq_id);
// Perform classification based on remaining fields...
eq_id = GET_EQID (DSCP_LUT_local, 2);
BMP_INTERSECTION (eq_id);
eq_id = GET_EQID (SRC_PORT_LUT_local, 3);
BMP_INTERSECTION (eq_id);
eq_id = GET_EQID(DST_PORT_LUT_local, 4);
BMP_INTERSECTION (eq_id);
return SELECT_RULE ( );
```

In reality, due to micro-architectural issues such as the structure of the processor's pipeline, a different instruction ordering can be chosen to hide the extra load latency. This ordering is shown below.

| Instructions | Number of cycles | |
|---|---|---|
| | Typical | Worst |
| field = LOAD_PKT (&packet, 0); | 2 | 2 |
| eq_id1 = T1_LOOKUP (SRC_ADDR_DB_local, 0); | 1 | 1 |
| eq_id2 = T1_LOOKUP (DST_ADDR_DB_local, 1); | 1 | 1 |
| eq_id1 = T2_LOOKUP (eq_id1, 0); | 1 | 8 |
| eq_id2 = T2_LOOKUP (eq_id2, 1); | 1 | 8 |
| BMP_INTERSECTION (eq_id1); | 1 | 1 |
| BMP_INTERSECTION (eq_id2); | 1 | 1 |
| eq_id1 = GET_EQID (DSCP_LUT_local, 2); | 1 | 1 |
| eq_id2 = GET_EQID (SRC_PORT_LUT_local, 3); | 1 | 1 |
| eq_id3 = GET_EQID (DST_PORT_LUT_local, 4); | 1 | 1 |
| BMP_INTERSECTION(eq_id1); | 1 | 1 |
| BMP_INTERSECTION(eq_id2); | 1 | 1 |
| BMP_INTERSECTION(eq_id3); | 2 | 2 |
| SELECT_RULE ( ); | 1 | 1 |
| Total: | 16 | 30 |

Suppose there are 128 rules (N=128). Instead of using 16/K data structure for the two fields with 32 bits (note: the 16/K data structure gives more compression for a large number of rules), a fixed and simplified 16/16 data structure can be used for these two fields. Thus, only 8 bits per entry for RIB_T1 and RIB_T2 tables are required where the significant bit is used as a marker bit in RIB_T1, and the remaining 7 bits are sufficient to store eqID or a pointer. In this case, the RIB_T1 table size is $2^{16}$=64 Kbytes.

For the two fields with 32 bits, the total RIB_T1 table size is 2*64=128 KB. For the two fields with 16 bits (source and destination port numbers), the RIB table size is 64 KB per field. For all the other fields, the RIB table size is negligible. For the bitmap table per field, its size is $(2N+1)N \approx 2^{15}$ bits=4 KB. Thus the total size is less than 300 KB for all the tables (RIB and BMP tables) except the two RIB_T2 tables for IP source and destination addresses. So, all these tables can be put into on-chip memory or RAM except the two RIB_T2 tables, which are put on external SRAM.

In the above ordering, the cycle count per instruction is also given for both the typical case (where a cache hit is assumed) and a worst case (where a cache miss is assumed). The LOAD_PKT instruction has an extra cycle of load latency that cannot be hidden since the following instructions depend on the result from this instruction. For the typical case, each packet classification for the five fields requires 16 cycles. For the worst-case assuming there is cache miss for the two accesses to RIB_T2 tables that will cause processor to stall (8 cycles), each packet classification requires 30 cycles. This is equivalent to 6.67 million packets per second in the worst case for an Xtensa processor at 200 MHz. Thus, by using two processors at 200 MHz with the proper configuration, OC48 wire-speed packet classification can be achieved for multiple fields matching with sophisticated rules of ranges and/or prefixes.

It should be noted that many variations and alternative combinations of functionality per instruction can be implemented, yielding possible further performance improvements. For example, the functionality of instruction BMP_INTERSECTION to perform bitmap intersection can be incorporated into instructions T2_LOOKUP and GET_EQID. This may save a few cycles per packet classification. Even further alternatives and variations will be apparent to those skilled in the art after being taught by the examples above.

Even further refinements using the Xtensa processor are possible in order to scale packet classification performance in accordance with the present invention: pipeline and parallel processing. Adding customized instructions is one way of adding more pipelines to improve performance. To further scale packet classification performance, parallel processing using multiple processors (MP) can be employed to implement the classification engine, using either distributed memory or shared memory.

Figure 8:
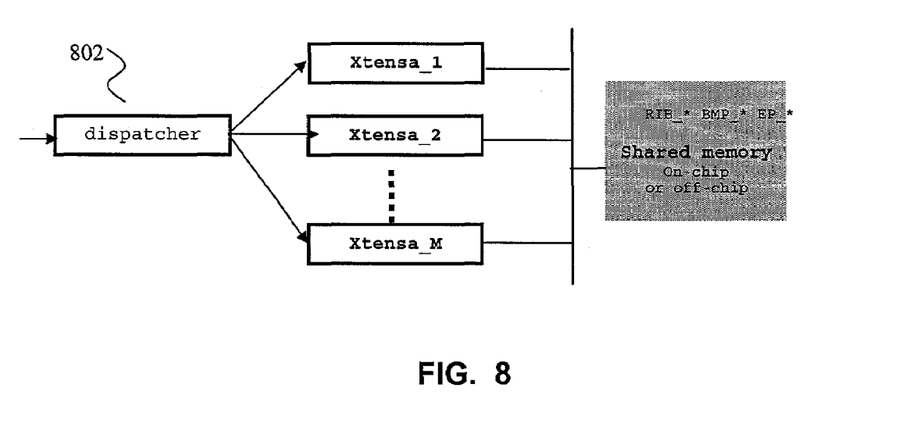
FIG. 8 is a block diagram illustrating an implementation of a classification engine using parallel processing with multiple processors and shared memory in one possible embodiment.

FIG. 8 illustrates an example architecture using MP with shared memory. A dispatcher 802 forwards an incoming packet to one of the processors for classification. A processor performs packet classification by matching all the fields in the packet against the classifier rule database. All the tables are stored at a central shared memory. The number of processors to be used can be engineered depending on the interface speed. For example, for a OC48 wire-speed packet classification, two processors may be needed, while for OC192 eight processors may be needed.

Figure 9:
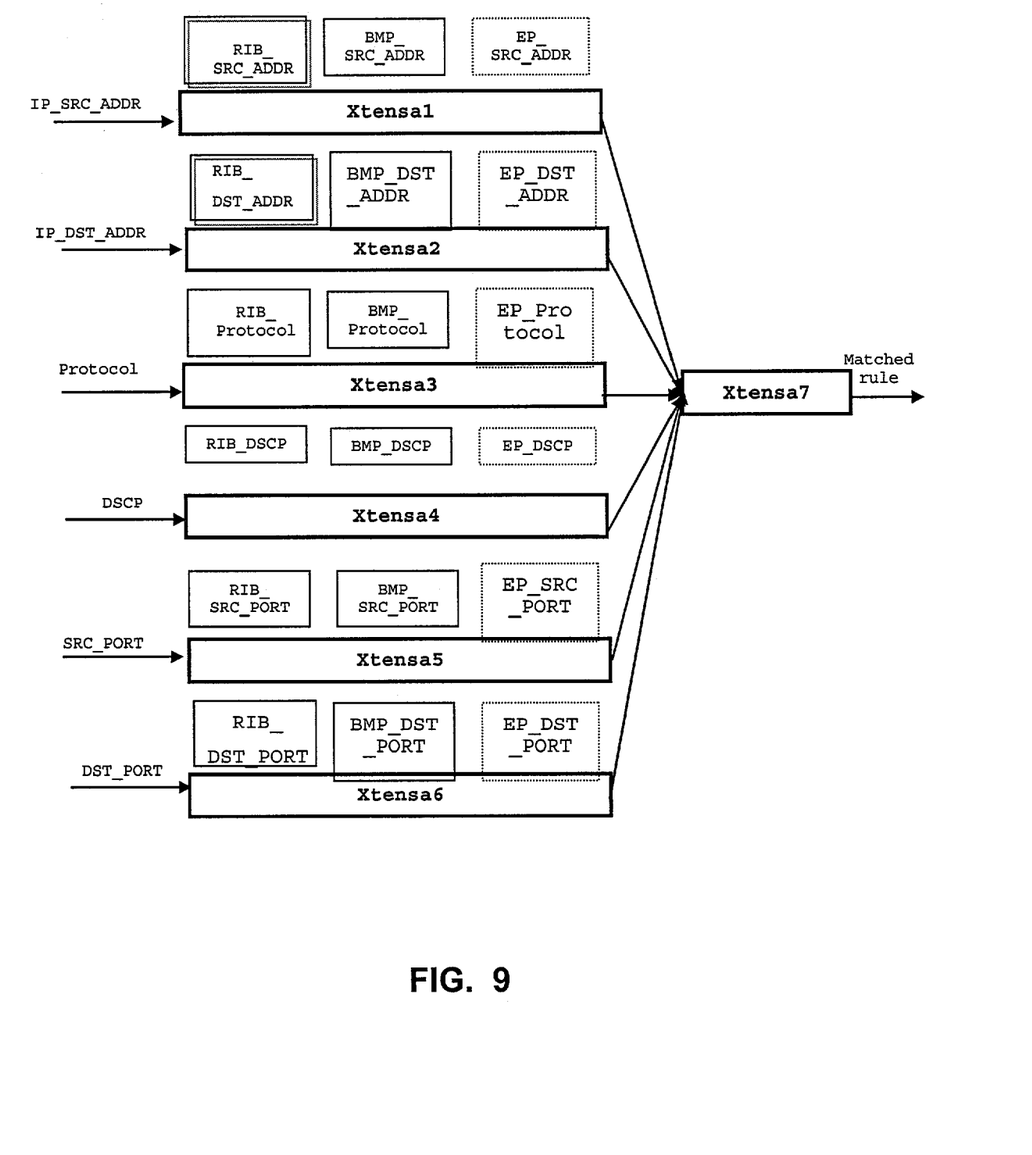
FIG. 9 is a block diagram illustrating an implementation of a classification engine using parallel processing with multiple processors and distributed memory in another possible embodiment.

FIG. 9 illustrates an alternative parallel processing architecture. In this example, one processor can be used to match a respective one of each field. Specifically, Xtensa-1 is used to perform matching an incoming packet for its IP source address against the rule database, Xtensa-2 for IP destination address, Xtensa-3 for protocol number, Xtensa-4 for DSCP field, Xtensa-5 for source port, and Xtensa-6 for destination port. The RIB, BMP and EP tables for each field need to be stored locally. In other words, the RIB, BMP and EP tables for IP source address need to be stored at Xtensa-1 only since they will not be used elsewhere. At last, another processor Xtensa-7 is used to find the matched rule with highest priority.

The algorithms and data structure presented herein can be scaled to support a large number of rules by dividing the rules into blocks and using either or both of the following two approaches: macro-bit—use a bit per block of rules instead of one bit per rule. If a bit in the macro-bit is turned on, this indicates that at least one of rules in this block is matched; more processors—use one set of processors to handle one block of rules and another set of processors to handle a different block of rules.

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A packet classification method comprising:

receiving a packet;

matching, using a processor, a plurality of fields of the packet against N classification rules, the matching step including, for each field:

associating equivalent IDs with respective values of the field, associating a respective bitmap with each equivalent ID, the bitmap providing an indication of a matching classification rule, and determining the bitmap associated with a value of the field in the packet;

determining a possible range of values associated with a field of the packet to be matched;

identifying the possible range of values as a first rudimentary interval with associated endpoints;

parsing a packet classifying rule to determine a matching range associated with the field;

identifying upper and lower ends of the matching range;

comparing the upper and lower ends of the matching range with the endpoints associated with the first rudimentary interval;

creating up to two new rudimentary intervals based on a case result of the comparing step;

associating adjusted endpoints with each of the first and up to two new rudimentary intervals in accordance with the case result and the upper and lower ends so as to facilitate packet classification based on the possible range of values of the packet field including the matching range; and preparing to forward the packet using the packet classifying rule.

2. A method according to claim 1, further comprising:

associating bitmaps with each of the first and up to two new rudimentary intervals, the bitmaps providing an indication of whether the rule is matched in that rudimentary interval of the field.

3. A method according to claim 1, further comprising:

parsing a new rule to determine a new matching range associated with the field;

identifying new upper and lower ends of the new matching range;

comparing the new upper and lower ends of the new matching range with the adjusted endpoints associated with the first and up to two new rudimentary intervals;

creating up to two additional rudimentary intervals based on a case result of the new comparing step; and associating adjusted endpoints with certain of the rudimentary intervals in accordance with the case result and the new upper and lower ends.

* * * * *